(12) United States Patent
Yon et al.

(10) Patent No.: US 8,816,283 B2
(45) Date of Patent: Aug. 26, 2014

(54) DEVICE FOR DETECTING AN ELECTROMAGNETIC RADIATION

(75) Inventors: Jean-Jacques Yon, Sassenage (FR); Pierre Imperinetti, Seyssins (FR); Alexandre Mary, Chatellerault (FR); Wilfried Rabaud, Villard de Lans (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/881,324

(22) PCT Filed: Oct. 25, 2011

(86) PCT No.: PCT/FR2011/000573
§ 371 (c)(1),
(2), (4) Date: Apr. 24, 2013

(87) PCT Pub. No.: WO2012/056124
PCT Pub. Date: May 3, 2012

(65) Prior Publication Data
US 2013/0240738 A1    Sep. 19, 2013

(30) Foreign Application Priority Data
Oct. 26, 2010 (FR) .................................. 10 04203

(51) Int. Cl.
| G01J 5/04 | (2006.01) |
| G01J 5/06 | (2006.01) |
| G01J 5/20 | (2006.01) |
| G01J 5/10 | (2006.01) |
| G01J 5/02 | (2006.01) |
| G01J 5/08 | (2006.01) |

(52) U.S. Cl.
CPC .... G01J 5/10 (2013.01); G01J 5/06 (2013.01); G01J 5/20 (2013.01); *G01J 2005/068* (2013.01); G01J 5/045 (2013.01); G01J 5/0285 (2013.01); G01J 5/02 (2013.01); G01J 5/04 (2013.01); G01J 5/0853 (2013.01); G01J 5/046 (2013.01)
USPC ........................................ 250/338.4; 257/433

(58) Field of Classification Search
USPC ................. 250/338.1, 338.4, 339.01, 339.02; 257/428, 431, 432, 433
See application file for complete search history.

(56) References Cited

U.S. PATENT DOCUMENTS

| 6,102,564 A | 8/2000 | Egawa |
| 7,807,972 B2 * | 10/2010 | Lambkin et al. ............... 250/353 |

(Continued)

FOREIGN PATENT DOCUMENTS

| EP | 0875197 A1 | 11/1998 |
| FR | 2822541 A1 | 9/2002 |
| JP | A-9-126883 | 5/1997 |

OTHER PUBLICATIONS

Apr. 30, 2013 International Preliminary Report on Patentability issued in International Patent Application No. PCT/FR2011/000573 (with translation).

Dumont et al., "Innovative on-chip packaging applied to uncooled IRFPA," Proceedings of the SPIE conference "Infrared Technology and Applications XXXIV," 2008, pp. 1Y-1 to 1Y-6, vol. 6940, Grenoble, France.

(Continued)

*Primary Examiner* — Mark R Gaworecki
(74) *Attorney, Agent, or Firm* — Oliff PLC

(57) ABSTRACT

The electromagnetic radiation detection device includes, on a same substrate:
at least one active detector of the electromagnetic radiation provided with a first element sensitive to said radiation,
at least one reference detector including a second element sensitive to said electromagnetic radiation, and
a lid provided with first reflective means reflecting the incident electromagnetic radiation, said lid covering without contact the second sensitive element and defining with the substrate a cavity having the reference detector housed therein. The lid is designed to improve the sensitivity of the detection device.

19 Claims, 10 Drawing Sheets

(56) References Cited

U.S. PATENT DOCUMENTS

| | | | |
|---|---|---|---|
| 8,487,260 B2 * | 7/2013 | Lane et al. | 250/339.01 |
| 2007/0108388 A1 * | 5/2007 | Lane et al. | 250/353 |
| 2007/0120060 A1 * | 5/2007 | Lane et al. | 250/353 |
| 2007/0138394 A1 * | 6/2007 | Lane et al. | 250/353 |
| 2007/0138395 A1 | 6/2007 | Lane et al. | |
| 2008/0202209 A1 | 8/2008 | Lambkin et al. | |

OTHER PUBLICATIONS

Dec. 27, 2011 International Search Report issued in International Patent Application No. PCT/FR2011/000573; with English-language translation.

* cited by examiner

US 8,816,283 B2

DEVICE FOR DETECTING AN ELECTROMAGNETIC RADIATION

TECHNICAL FIELD

The present disclosure relates to a device for detecting an electromagnetic radiation comprising, on a same substrate:
- at least one active electromagnetic radiation detector provided with a first element sensitive to said radiation,
- at least one reference detector comprising a second element sensitive to said electromagnetic radiation, said second sensitive element having a first main surface facing the incident electromagnetic radiation and a second main surface facing the substrate, and
- a lid provided with first reflective means reflecting the incident electromagnetic radiation, parallel to the first main surface of the second sensitive element, said lid covering without contact the second sensitive element and defining with the substrate a cavity having the reference detector housed therein, said active detector being outside of the cavity.

STATE OF THE ART

Devices for detecting an electromagnetic radiation integrate one or several electromagnetic radiation detectors. Electromagnetic radiation detectors comprise bolometers, which use a thermally-induced change of the electric properties of the materials forming the bolometer, such as the resistance or the dielectric constant.

Bolometers enable to measure the power of an electromagnetic radiation in the terahertz range or of infrared rays by conversion of the radiation into an electric signal. As illustrated in FIGS. 1 and 2, a bolometric detector of resistive type comprises a bolometric plate 1 suspended above a substrate 2.

Bolometric plate 1 is formed of a membrane 3 absorbing the electromagnetic radiation and of a thermistor 4 formed of a thermosensitive semiconductor material, having as an essential characteristic a variation of its electric resistance when its temperature varies. Membrane 3 is suspended via thermal insulation arms 5 attached to substrate 2 by anchoring points 6. Membrane 3 absorbs the incident radiation, turns it into heat and transmits the heat to a thermistor 4. The temperature rise of thermistor 4 then induces a voltage or current variation, across the bolometric detector, measured by an appropriate electric assembly. Electrodes (not shown) are for example arranged at the level of anchoring points 6. Conventionally, a read circuit is integrated to substrate 2 and exploits the performed measurements. Thermal insulation arms 5 thermally insulate membrane 3 from substrate 2 and thus improve the measurement sensitivity.

A high-performance operation of the bolometric detector requires three main conditions: a low thermal mass, a good thermal insulation of membrane 3 from substrate 2, and a good sensitivity for the conversion of the heating into electric signal. The first two conditions are obtained by a thin-film forming of the bolometric detector.

Monolithic infrared imagers operating at ambient temperature are manufactured by directly connecting a bolometric detector array to a CMOS- or CCD-type silicon multiplexing circuit.

The reading of a bolometric detector is based on the measurement of the value of the resistance of thermistor 4 and of its variations. When these variations are very small, in particular, for infrared (IR) detection, the detected signal is amplified within the read circuit through a high-gain amplifier or integrator stage. Generally, the integrator stage is preferred since it intrinsically decreases the bandwidth and thus eliminates the white noise.

In the case of the integrator, the current originating from the bolometric detector and integrated in the integrator rapidly saturates the output signal of an integrated circuit (readout integrated circuit, ROIC). The useful current containing the scene information then only amounts for a fraction of the total integrated current. To increase the reading sensitivity, the invariant fraction of the current is conventionally diverted into a so-called base lining branch of the circuit, which only sends the variable portion of the current, corresponding to the imaged scene, towards the integrator.

FIG. 3 illustrates the principle of the reading of a bolometer detection device. The device comprises an active bolometer 7 which absorbs an incident electromagnetic radiation 8 and enables to measure radiation 8. The variation of the resistance of active bolometer 7 is representative of the value of radiation 8. A current reading is for example used to perform this measurement. The current, at the output of active bolometer 7, comprises a variable fraction and an invariant fraction. Indeed, the detection device has an absolute operation, that is, it detects a continuous invariant background signal, which may disturb the measurement of the variable useful signal, which is generally small as compared with the background signal. It is thus desirable to eliminate this invariant fraction of the current to obtain an optimal measurement of the radiation value.

To increase the reading sensitivity, the invariant fraction of the current, called offset current, is preferably diverted into a bypass branch, to only send the variable portion of the current, called useful current, to an integrator 9. In terms of electronics, the element which is used for the bypass branch must be as noiseless as possible to cause the least possible disturbance. For this purpose, the branch is formed via a resistor having a value of the same order of magnitude as an active bolometer 7. The resistance is connected to a MOS transistor assembled with a common gate, or in a direct injection assembly, which enables to both bias the resistor and perform an impedance matching between the resistor and the amplifying stage.

A conventional solution comprises using a reference bolometer 10 as the bypass branch resistor, that is, a bolometer 10 which does not detect electromagnetic radiation 8.

The bypass branch thus comprises, as shown in FIG. 3, a reference bolometer 10, which is made blind by a protection shield 11 placed between electromagnetic radiation 8 and reference bolometer 10. Reference bolometer 10 is thus turned into a passive bolometer, which absorbs no radiation and is used as a reference.

The efficiency of this type of detection device depends on the characteristics of reference bolometer 10 and on its capacity of being totally blind.

As shown in FIG. 4, document US-A-2007138395 provides a detection device comprising an active bolometer 7 and a reference bolometer 10 formed on a same first substrate 2a. First and second lids are formed from a second substrate 2b and sealed to first substrate 2a via a sealing material to respectively cover active bolometer 7 and reference bolometer 10. The second lid is made opaque to incident electromagnetic radiation 8 by deposition of an opaque layer 11 arranged on the external surface of the second lid, between incident electromagnetic radiation 8 and reference bolometer 10.

The described detection device has the disadvantage of being bulky. Indeed, the sealing imposes using lids having sufficiently large dimensions to enable them to be manipulated and to comply with the mechanical constraints of the device. As an illustration, the infrared detection device has lids 2b having a high lateral wall thickness, typically ranging between 50 µm and 100 µm and leaving a significant space d, typically of 160 µm, between a plane AA running through bolometers 7 and 10, and a plane BB parallel to plane AA running through lid 2b, for a 10-µm wavelength to be detected. A significant distance separating opaque layer 11 from plane AA imposes, on the one hand, accordingly spacing active bolometer 7 apart from reference bolometer 10 and, on the other hand, using a reflective shield larger than reference bolometer 10. Indeed, opaque layer 11 must generally be sized to be substantially larger than the surface area of reference bolometer 10 to take into account the angle of incidence of the optical rays originating from the camera focusing system. The angles of incidence generally range between −30° and +30° for an open optical system F/1 corresponding to the lenses generally used for infrared cameras based on detectors with microbolometers. Similarly, in such conditions of geometry and given the angles of incidence of electromagnetic radiation 8, active bolometer 7 and reference bolometer 10 must be spaced apart by a sufficient distance to correctly mask reference bolometer 10, without however obstructing active bolometer 7.

Such dimensional constraints have an impact not only on the cost of the actual detection device, but also on the cost of the optical system, which has a volume depending on the size of the detection device. The cost factor is all the stronger for modern infrared detection devices with a resolution which is desired to be improved by increasing the number of pixels and comprising a large number of bolometers, 7 and 10.

Further, the sealing operation is particularly delicate and expensive since it implies manipulating a set of fragile bolometers and generally occurs in a clean room with constraining and expensive cleanness specifications.

Finally, the use of an opaque layer 11 above the reference bolometer is not sufficient to optimally suppress the offset current and accordingly does not enable to detect very low signals. This disadvantage is particularly detrimental for IR imaging devices which require the use of high gains of detection of the IR imaging scene signal, obtained by pulsed biasing of the bolometric resistor.

OBJECT OF THE INVENTION

The present invention aims at a detection device enabling to reliably and accurately measure an electromagnetic radiation and, especially providing a better resolution of the signal transmitted by the detection device and an improved sensitivity.

The present invention also aims at a low-bulk and low-cost detection device.

In particular, the present invention aims at an optimized detection device comprising a large number of pixels and enabling to amplify at best a signal of IR imaging scenes, with high gains and an improved thresholding of the offset current.

This aim can be achieved by the appended claims and more specifically by the fact that:
  the lid creates above the first main surface an empty space separating said first main surface from the lid by a distance d ranging between 0.5 µm and 5 µm,
  the lid comprises second lateral reflective means inhibiting the transmission of a secondary electromagnetic radiation originating from a transmission of said electromagnetic radiation by electromagnetic coupling, and the second lateral reflective means continue the first reflective means and form a continuous reflective shield with the first reflective means.

BRIEF DESCRIPTION OF THE DRAWINGS

The foregoing and other features and advantages of the present invention will be discussed in detail in the following non-limiting description of specific embodiments in connection with the accompanying drawings, among which.

DESCRIPTION OF SPECIFIC EMBODIMENTS OF THE INVENTION

The device for detecting an electromagnetic radiation 8 preferably is a device for detecting IRs and Terahertzes (THz).

Figure 5:
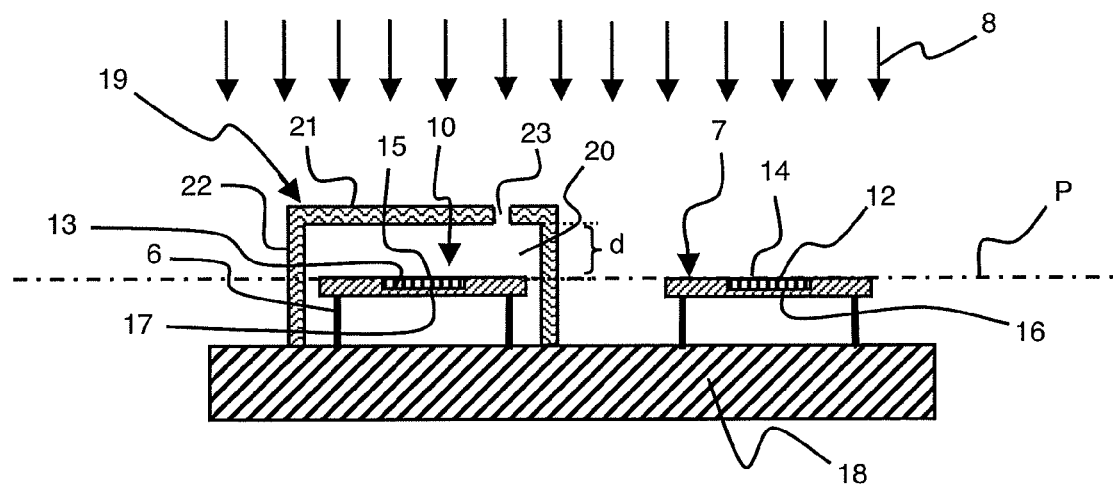
FIGS. 5 and 6 schematically show, respectively in cross-section and in perspective view, a first specific embodiment of a detection device according to the present invention.

According to a first specific embodiment shown in FIG. 5, a device for detecting an electromagnetic radiation 8 comprises an active detector 7 of electromagnetic radiation 8 provided with a first element 12 sensitive to said electromagnetic radiation 8 and a reference detector 10 comprising a element 13 sensitive to said electromagnetic radiation 8.

Reference detector 10 is preferably identical to active detector 7 of electromagnetic radiation 8. The dimensional characteristics and/or the materials forming reference detector 10 are selected to obtain, for a given electromagnetic radiation, a temperature response identical to that of active detector 7.

Advantageously, active detector 7 of electromagnetic radiation 8 and reference detector 10 respectively are an active bolometer 7 of electromagnetic radiation 8 and a reference bolometer 10.

Active bolometer 7 and reference bolometer 10 are advantageously designed to provide a same response to temperature variations and to measurement current variations. The similarity of the electric and thermal characteristics of active bolometer 7 and of reference bolometer 10, also called "matching", enables to subtract the disturbing effects, be they thermal as well as electric, to restore a more specific signal of active bolometer 7 by a differential reading of active bolometer 7 and of reference bolometer 10.

Advantageously, each of the first and second sensitive elements, 12 and 13, has a first main surface, respectively 14 and 15, facing incident electromagnetic radiation 8 and a second main surface, respectively 16 and 17. First main surfaces 14 and 15 are preferably parallel to second main surfaces 16 and 17.

Active bolometer 7 and reference bolometer 10 are arranged on a same substrate 18, next to each other and according to an identical arrangement so that the first main surfaces, 14 and 15, are advantageously in a same plane P. Plane P is, preferably, parallel to the main plane of substrate 18. Active bolometer 7 and reference bolometer 10 are close to each other to be submitted to the same environment. Thus, reference bolometer 10 is positioned as close as possible to active bolometer 7 without however touching it to obtain a response to thermal and electric noise identical to that of active bolometer 7. Further, the proximity of the two bolometers, 7 and 10, contributes to making the detection device more compact.

Substrate 18 is a support conventionally made of silicon. Substrate 18 ensures the mechanical stiffness of active bolometer 7 and of reference bolometer 10 and preferably comprises devices for biasing and for reading the thermistor resistor (not shown). Substrate 18 may also comprise multiplexing components enabling, especially in the case of an IR detection device with an array structure of several microbolometers, serializing the signals originating from the different microbolometers and transmitting them to a decreased number of outputs, so that they can be used by a usual imaging system. The joint presence of active bolometer 7 and of reference bolometer 10 allows a differential reading of the signals delivered by the two bolometers, 7 and 10, and enables to extract the signal resulting from incident electromagnetic radiation 8 while canceling, or at least minimizing the sensitivity of the detection device to electric and thermal noise.

Figure 6:
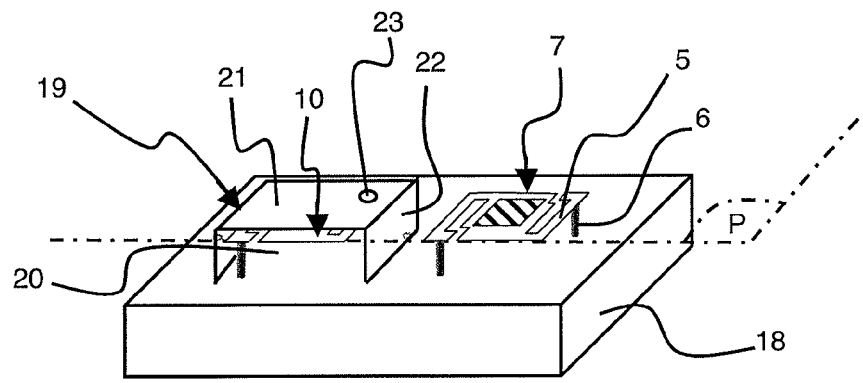

As shown in FIGS. 5 and 6, active bolometer 7 and reference bolometer 10, advantageously have an insulating structure with microbridges of microbolometer type. Each structure conventionally comprises anchoring points 6 and thermal insulation arms 5 (FIG. 6) to minimize the heat conduction. The microbridge structure advantageously decreases the response time of the signals transmitted by the device for detecting electromagnetic radiation 8 and improves the signal-to-noise ratio.

The device for detecting electromagnetic radiation 8 also comprises a lid 19 which covers without contact second sensitive element 13 exposed to electromagnetic radiation 8. Lid 19 and substrate 18 define a cavity 20 having reference bolometer 10 housed therein.

According to a specific embodiment, lid 19 is formed by an upper side 21 and two lateral sides 22 substantially perpendicular to upper side 21, to form an upside-down U on substrate 18, open at its two ends.

Lid 19 bears on substrate 18 via the two lateral sides 22 and covers reference bolometer 10 by forming a bridge above reference bolometer 10. Each lateral side 22 has a continuous internal surface and a continuous external surface. External surface designates a surface facing the outside of lid 19 as opposed to the internal surface, facing the inside of lid 19, that is, cavity 20.

The second reflective means form at least the continuous internal surfaces and the continuous external surfaces of lateral sides 22.

As shown in FIGS. 5 and 6, upper side 21 and the two lateral sides 22 form a bridge above reference bolometer 10.

Cavity 20 is open at the two ends of lid 19. Upper side 21 is preferably parallel to first main surface 15 of second sensitive element 13 and has a continuous external surface, facing incident electromagnetic radiation 8 to mask reference bolometer 10 from incident electromagnetic radiation 8.

Each lateral side 22 has a continuous external surface. The dimensions of lid 19 are greater than the dimensions of reference bolometer 10.

Although term "continuous external surface" is used, the external surfaces of upper side 21 and of lateral sides 22 are considered as continuous even in the presence of one or several through openings, provided that each opening 23 has small dimensions as compared with the wavelength to be detected. Opening 23 may have different shapes, for example, a square or circular shape. Each opening 23 has a size smaller than 1 µm in its largest dimension, to satisfactorily attenuate the transmission via opening 23 of incident radiation 8 inside of lid 19.

Lid 19 creates, above first main surface 15 of second sensitive element 13, an empty space. The empty space is advantageously small to decrease as much as possible the volume of the device for detecting electromagnetic radiation 8. The empty space separates first main surface 15 from lid 19 by a distance d, advantageously, ranging between 0.5 µm and 5 µm, preferably, greater than or equal to 0.5 µm and strictly smaller than 2 µm. In particular, distance d separates first main surface 15 from the internal surface of upper side 21 of lid 19.

Lid 19 comprises first reflective means and second lateral reflective means. The first and second reflective means may be formed of reflectors, for example, formed by a metal layer.

According to the specific embodiment shown in FIGS. 5 and 6, the first reflective means form upper side 21 of lid 19 and the second reflective means form lateral sides 22. The second lateral reflective means continue the first reflective means and form a continuous reflective shield with the first reflective means.

Lid 19 is entirely formed by the continuous reflective shield. Lid 19 forming a reflective shield may be formed by a thin reflective layer of at least one material highly opaque to the considered electromagnetic radiation 8. To avoid the forming of ghost images due to an insufficiently opaque lid 19 and a residual sensitivity of reference bolometer 10 to electromagnetic radiation 8, the attenuation factors of incident electromagnetic radiation 8 preferably range between approximately 60 dB and 80 dB. A metal layer having a low resistivity and an adequate thickness enables to guarantee a sufficient reflection of incident electromagnetic radiation 8 to deviate it to the outside of lid 19.

Lid 19 may advantageously be formed by a metal layer of at least one metal material selected from among aluminum, titanium, gold, nickel, tantalum, tungsten, molybdenum, nitrides and silicides thereof, and their alloys. Tungsten silicide (WSi) and titanium nitride (TiN) may be mentioned as an example.

The continuous reflective shield preferably is a thin metal layer having an average thickness ranging between 100 nm and 1,000 nm and a resistivity ranging between 1 µΩ.cm and 500 µΩ.cm.

As a variation, the continuous reflective shield is formed by metal polymer reflectors or reflectors of Bragg filter type conventionally formed by an alternation of two layers of materials having different refraction indexes.

The first reflective means are intended to reflect incident electromagnetic radiation 8. The first reflective means avoid the transmission of electromagnetic radiation 8 through lid 19 to reference bolometer 10. Thus, the first reflective means mask reference bolometer 10, which becomes insensitive to incident electromagnetic radiation 8.

However, the second lateral reflective means are intended to inhibit the transmission of a secondary electromagnetic radiation originating from a transmission of electromagnetic radiation 8 by electromagnetic coupling.

Figure 1:
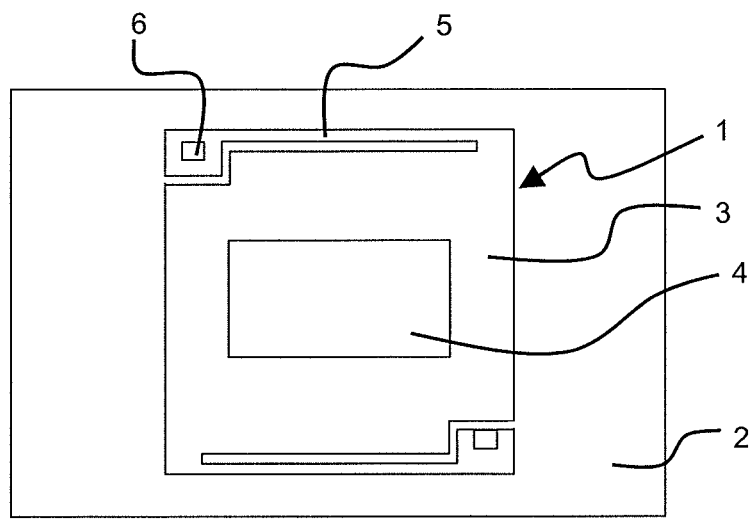
FIGS. 1 and 2 schematically show, respectively in top and in perspective view, a bolometric detector according to prior art.
Figure 2:
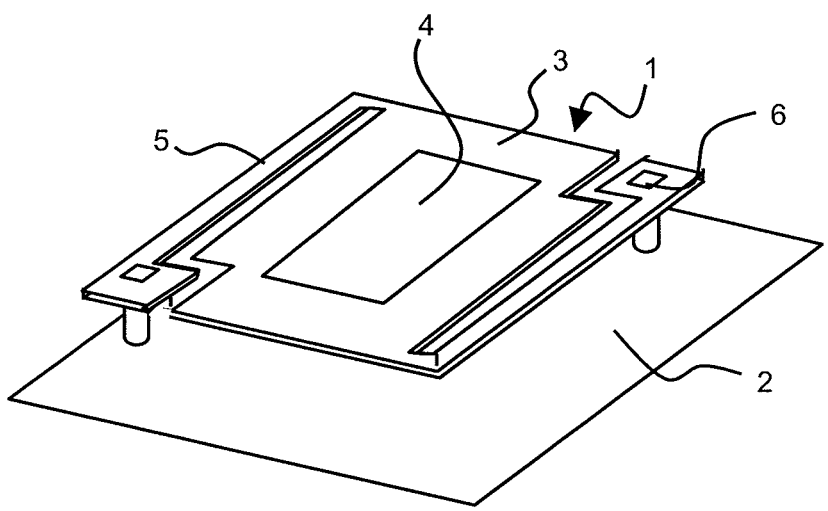
Figure 3:
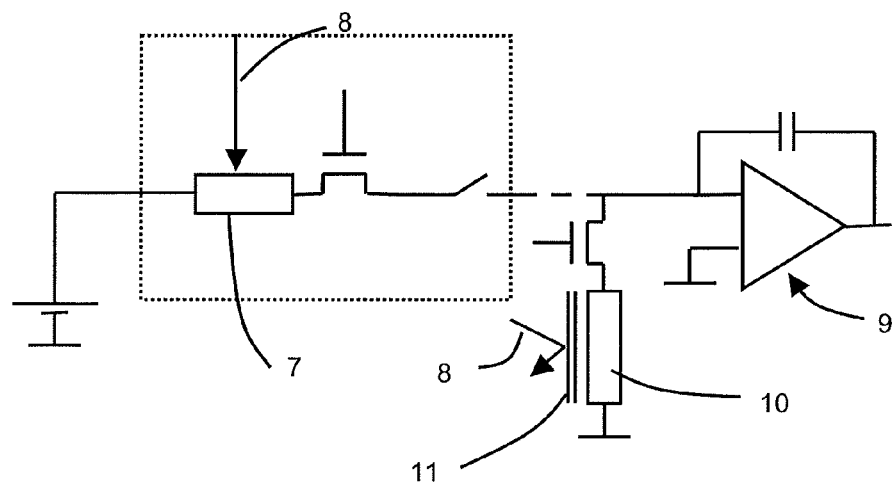
FIG. 3 schematically shows the principle of the reading of a detection device according to prior art.
Figure 4:
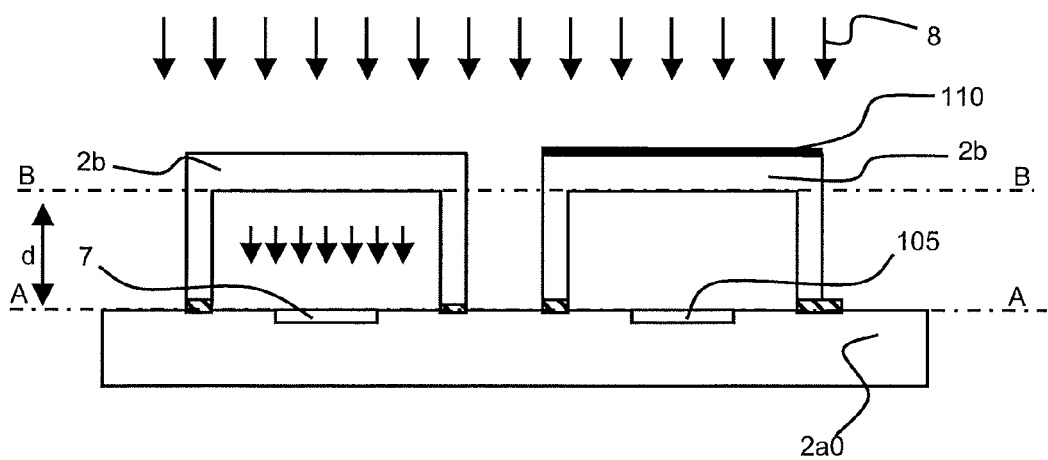
FIG. 4 schematically shows in cross-section view a detection device according to prior art.

Indeed, for a prior art detection device shown in FIG. 4, when the space which separates opaque layer 11 from reference bolometer 10 becomes smaller than the wavelength to be detected, a significant electromagnetic coupling occurs between the edges of opaque layer 11 of second substrate 2b forming a lid and reference bolometer 10. Such an electromagnetic coupling is negligible in the case of document US-A-20070138395 given the 160-μm distance which separates opaque layer 11 from reference bolometer 10. However, the electromagnetic coupling become determining when the empty space is small, especially ranging between 0.5 μm and 5 μm, as compared with the wavelength to be detected, on the order of 10 μm for a thermal infrared radiation 8. This coupling translates as an unwanted transmission of incident electromagnetic radiation 8, towards the inside of lid 19 towards reference bolometer 10. Electromagnetic radiation 8 transmitted within the lid then forms a secondary electromagnetic radiation which disturbs the measurement. The secondary electromagnetic radiation originates from plasmon-type surface waves, which come up under the effect of incident electromagnetic radiation 8 at the level of the first reflective means on upper side 21 of lid 19, which act as a lateral Pérot-Fabry cavity. The energy of the surface waves absorbed by the Pérot-Fabry cavity is transmitted in the form of a secondary electromagnetic radiation which couples with the resonance modes of the lateral Pérot-Fabry cavity. The secondary electromagnetic radiation is then significant in the lateral Pérot-Fabry cavity and the confined energy is absorbed by reference bolometer 10. The presence of second lateral reflective means 22 enables to suppress this disadvantage by inhibiting the secondary electromagnetic radiation. Second lateral reflective means 22 direct the energy of the secondary electromagnetic radiation towards substrate 18 and prevent it from penetrating into lid 19.

Figure 7:
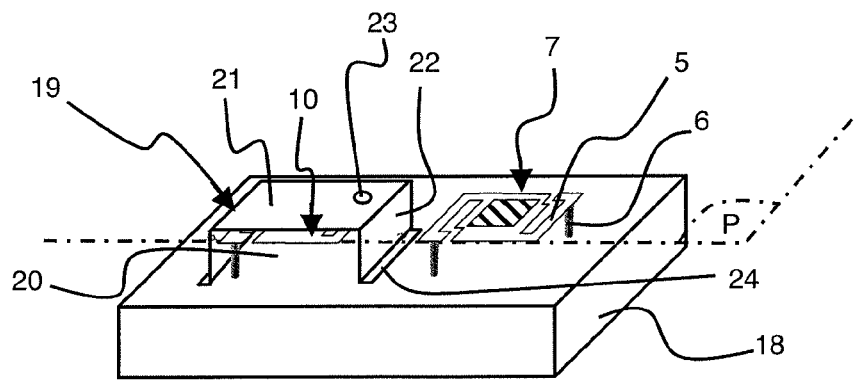
FIGS. 7 and 8 schematically show in perspective view variations of the detection device according to FIG. 6.
Figure 8:
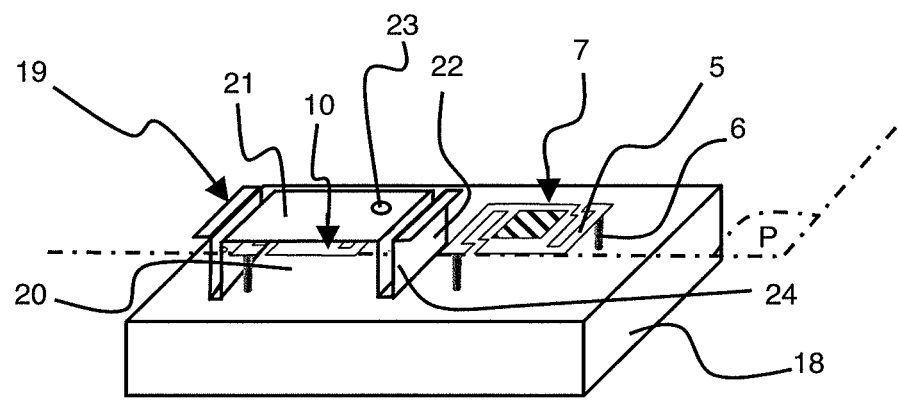

According to a variation shown in FIGS. 7 and 8, lid 19 has edges 24 along each end of lateral sides 22, forming a land on substrate 18.

As shown in FIG. 7, edges 24 may be formed by a horizontal return 19 forming the land.

As shown in FIG. 8, edges 24 may as a variation be formed by a first horizontal return forming a land on substrate 18 and continuing upwards (at the top of FIG. 8) in a second portion up to the height of upper side 21 of lid 19, to end in a third portion forming a horizontal return, essentially, in the same plane as upper side 21. The forming of such a lid 19 is advantageously achieved by conventional thin-film deposition and etching techniques.

Figure 9:
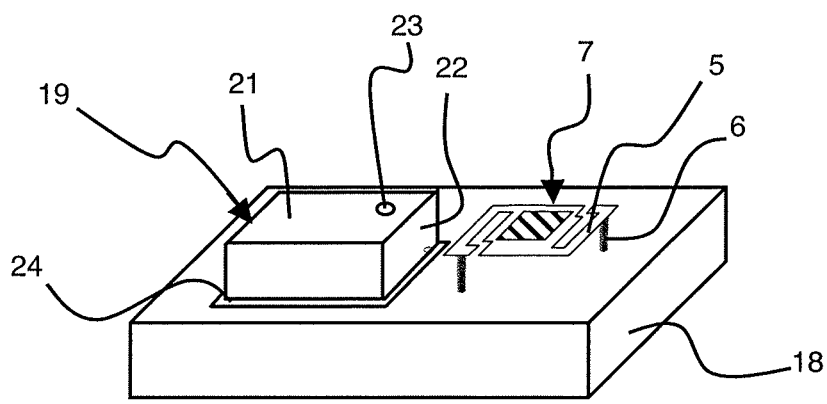
FIG. 9 schematically shows in perspective view another specific embodiment of a detection device according to the present invention.

According to a second specific embodiment shown in FIG. 9, lid 19 totally encapsulates reference bolometer 10 located in cavity 20. Lid 19 entirely covers reference bolometer 10, without being in contact therewith. Lid 19 thus forms a capsule which creates a closed cavity 20, possibly, tight, in which reference bolometer 10 is arranged (FIG. 9). Closed cavity 20 is defined by lid 19 in its upper portion (at the top of FIG. 9) and by substrate 18 in its lower portion (at the bottom of FIG. 9).

As shown in FIG. 9, lid 19 may comprise an edge 24 bearing on substrate 18 which extends on a portion of substrate 18. Edge 24 is present all around lid 19, thus improving the adherence and, possibly, the tightness of lid 19.

Figure 10:
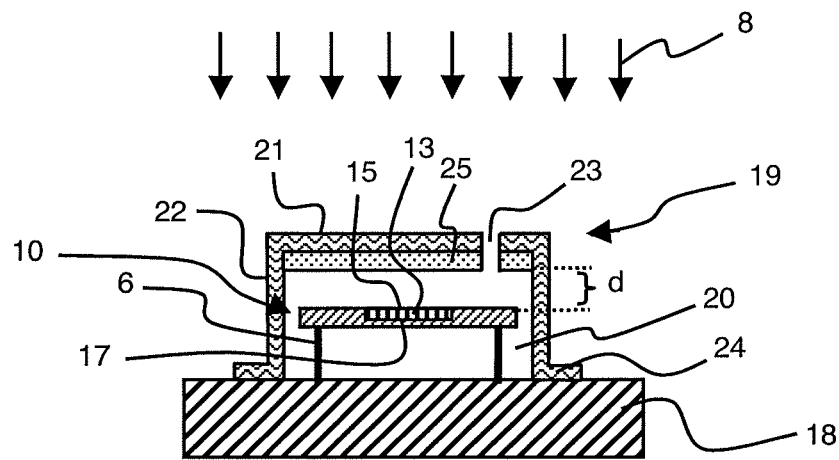
FIG. 10 schematically shows in cross-section view another specific embodiment of a detection device according to the present invention.

According to a third specific embodiment shown in FIG. 10, the detection device differs from the specific embodiments described hereabove in that lid 19 comprises an additional structural layer 25 arranged between the continuous reflective shield and cavity 20. Lid 19 is formed by an external wall and an internal wall, the external wall being partly distinct from the internal wall. Indeed, the external wall of lid 19 forms the continuous reflective shield and structural layer 25 forms a portion of the internal wall of lid 19. In particular, upper side 21 is formed by a stack of two layers formed by the first reflective means and structural layer 25. Structural layer 25 and the first reflective means are preferably located parallel to first main surface 15 of second sensitive element 13.

A specific embodiment of such a device for detecting an electromagnetic radiation 8 will be described in further detail in relation with FIGS. 11 to 18. To ease the discussion, this description above all aims at a detection device adapted to infrared radiation, but it may be applied to other types of radiations, provided to make minor adaptations of prior art.

Figure 11:
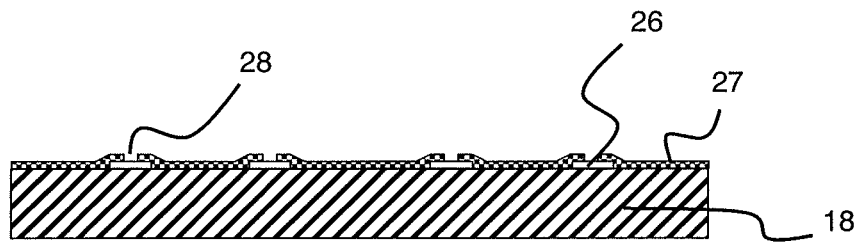
FIGS. 11 to 18 schematically show in cross-section view the different steps of a method for manufacturing the detection device according to FIG. 10.

As shown in FIG. 11, the method for manufacturing a device for detecting electromagnetic radiation 8 according to FIG. 9 comprises the forming of metal connection pads 26 from a silicon substrate 18 containing an already completed read circuit (not shown), obtained according to any known method of silicon microelectronics. Metal connection pads 26 enable to form the electric connections between, on the one hand, the electronic devices of the read circuit and, on the other hand, active bolometer 7 and reference bolometer 10. An insulating passivation layer 27 conventionally covers substrate 18 while creating uncovered portions 28 at the level of metal connection pads 26.

Figure 12:
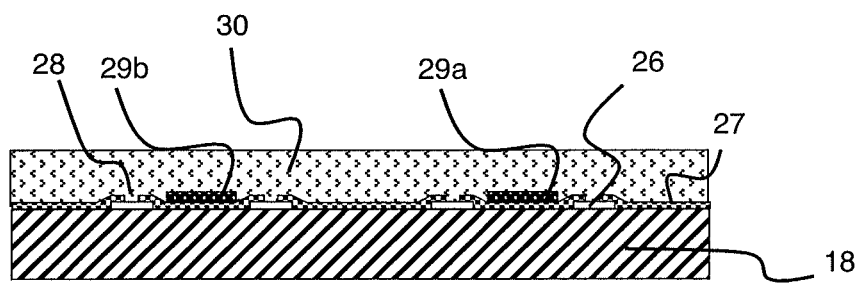

As shown in FIG. 12, a metal layer, for example, made of aluminum, is advantageously deposited and defined by photolithography and etching according to any known method, to form two infrared reflectors, 29a and 29b, at the surface of the read circuit. A first sacrificial layer 30, conventionally made of polyimide, is then spread and possibly annealed.

Figure 13:
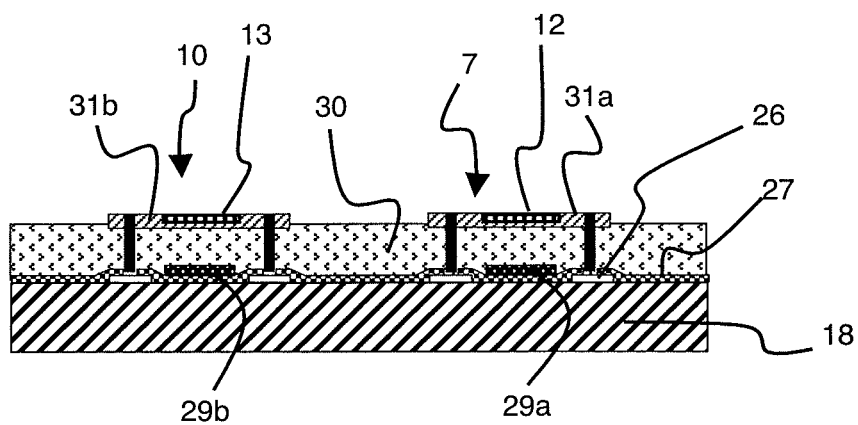

As shown in FIG. 13, bolometric plates 31a and 31b, respectively, of active bolometer 7 and of reference bolometer 10 are constructed on first sacrificial layer 30 according to any known method. Bolometric plates 31a and 31b respectively comprise first and second sensitive elements 12 and 13. First sacrificial layer 30 which is eventually removed enables to provide a space separating each reflector 29a and 29b, respectively, from bolometric plate 31a and 31b. Bolometric plates 31a and 31b are thus thermally insulated from the read circuit. The space is adapted for form a quarter-wave resonant cavity, for example, on the order of 2.5 μm, to detect a wavelength range centered on 10 μm.

Figure 14:
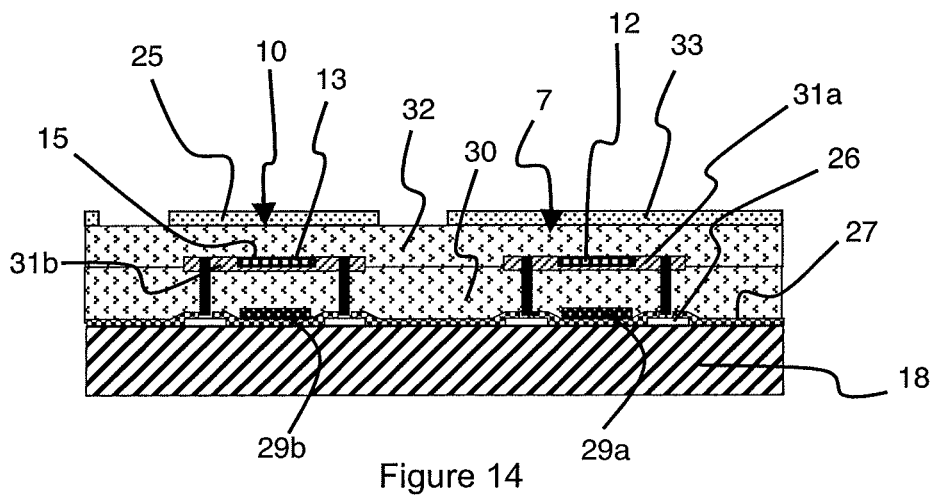

As shown in FIG. 14, a second sacrificial layer 32, advantageously, of same nature as first sacrificial layer 30, is spread above active bolometer 7 and reference bolometer 10. Second sacrificial layer 32 having lid 19 constructed thereon and eventually removed, enables to provide the empty space, previously defined, between first main surface 15 of reference bolometer 10 and lid 19. Distance d which separates lid 19 from first main surface 15 of second sensitive element 13 corresponds to the thickness of second sacrificial layer 32, preferably ranging between approximately 0.5 μm and 5 μm. The eventual creation of an empty space provides a significant thermal insulation between first main surface 15 and lid 19.

As shown in FIG. 14, a structural layer 25 is then formed according to any known method. Structural layer 25 is for example obtained by deposition of a first layer 33 made of amorphous silicon or of aluminum at the surface of second sacrificial layer 32, followed by a photolithography and an etching. The etching of first layer 33 is performed while sparing at least the local areas above active bolometer 7 and reference bolometer 10. At the end of this step, structural layer 25 and first residual layer 33 are obtained at the surface of second sacrificial layer 32.

Figure 15:
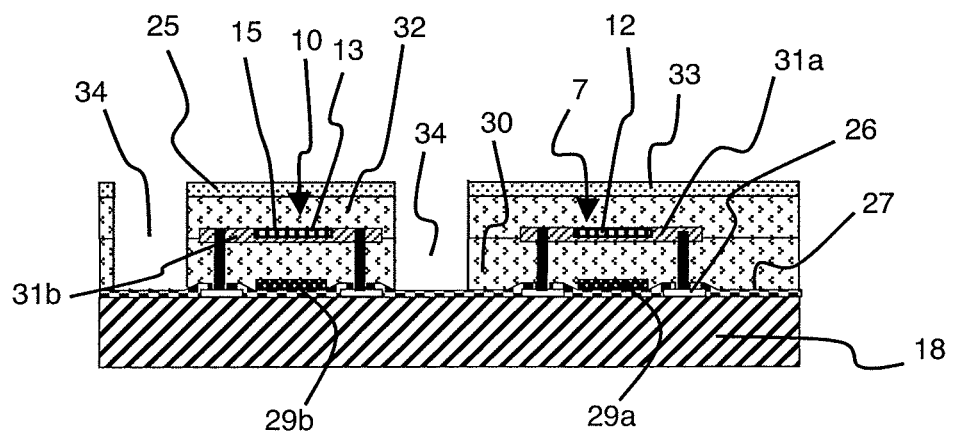

As shown in FIG. 15, structural layer 25 and first residual layer 33 are then used as a hard mask to more easily etch, along a vertical direction, first and second sacrificial layers 30 and 32 all the way to substrate 18. The etching then forms a recess 34 according to the desired shape of lid 19. In particular, to obtain a lid 19 which fully encapsulates reference bolometer 10 and forms a closed cavity 20, recess 34 may be formed by a continuous trench which surrounds reference bolometer 10 and which crosses the entire thickness of the first and second sacrificial layers, respectively 30 and 32. However, to obtain a lid 19 in the form of a bridge having an upper side 21 and two lateral sides 22, recess 34 may be formed by two approximately parallel trenches on either side of reference bolometer 10 (to the right and to the left of FIG. 15).

Figure 16:
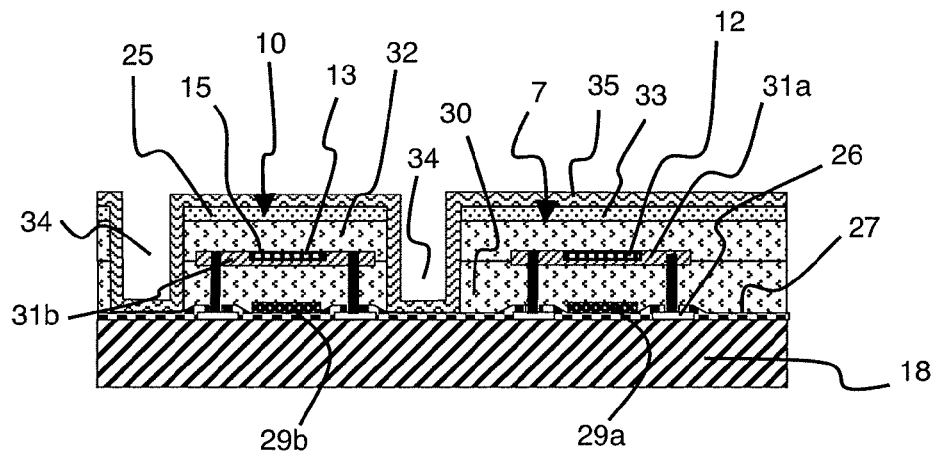

The etching conditions are adapted to obtain etch sides with a small overhang, especially at the interface between structural layer 25 and second sacrificial layer 32. To achieve this, a reactive ion etching (RIE) is preferred. As an example, the etching of a first polyimide layer 30 having a 2.5-μm thickness and of a second polyimide layer having a 2-μm thickness may be obtained by limiting said overhang, in the following RIE conditions:

- Ambient temperature: approximately 300 K
- Pressure ranging between 3 mTorrs et and 30 mTorrs
- Oxygen flow rate ranging between 10 cm$^3$/min and 100 cm$^3$/min
- Argon or nitrogen flow rate ranging between 10 cm$^3$/min and 100 cm$^3$/min
- Plasma excitation frequency 440 KHz or 13.56 MHz
- Plasma generation power ranging between 100 W and 1,000 W As shown in FIG. 16, a second reflective layer 35, preferably, metallic, is then deposited, according to any known method, to cover structural layer 25 as well as the spared areas of first layer 33. Second layer 35 also covers the side and the bottom of recess 34. The covering of structural layer 25 enables to form upper side 21 of lid 19. The covering of the side(s) of recess 34 forms lateral side(s) 22 of lid 19. The covering of the side(s) of recess 34 by this metal deposition is particularly important to provide a good opacity of lid 19 with respect to the secondary electromagnetic radiation. Indeed, lateral side(s) 22 form the second reflective means of the device for detecting electromagnetic radiation 8 and form a shield of protection from the secondary electromagnetic radiation, making the detector insensitive to this type of secondary radiation. Apart from the obtaining of etch sides with no overhang, the deposition of a second reflective layer 35 of conformal type is preferred since this characteristic takes part in the efficiency of the continuous reflective shield and in the improvement of the protection of reference bolometer 10.

The presence of a structural layer 25 enables to more easily define, by known hard mask techniques, the sides of first and second sacrificial layers 30 and 32 having lateral sides 22 bearing thereon.

As an example, second conformal metal layer 35 may be obtained by LPCVD (Low Pressure Chemical Vapor Deposition) of a thin tungsten silicide (WSi) layer having a thickness ranging between 100 nm and 500 nm, with a resistivity on the order of 200 μΩ.cm, with the ranges already described hereabove corresponding to the deposition conditions, a specific point of which is selected herein as an example:

- 250° C. temperature
- 0.8-Torr pressure
- Tungsten hexafluoride flow rate (WF$_6$) of 1.4 cm$^3$/min
- Silane (SiH$_4$) flow rate of 300 cm$^3$/min
- Argon (Ar) flow rate of 250 cm$^3$/min As a variation, other metal layers 35 may be used, for example, layers 35 of titanium nitride (TiN), molybdenum (Mo), tantalum (Ta), titanium (Ti), nickel (Ni), all preferably deposited by LPCVD. Second metal layers 35 deposited by plasma-enhanced chemical vapor deposition (PECVD) may also be appropriate, although they have a lower conformality, the deposition then requiring the forming of a larger thickness of second metal layers 35.

Figure 17:
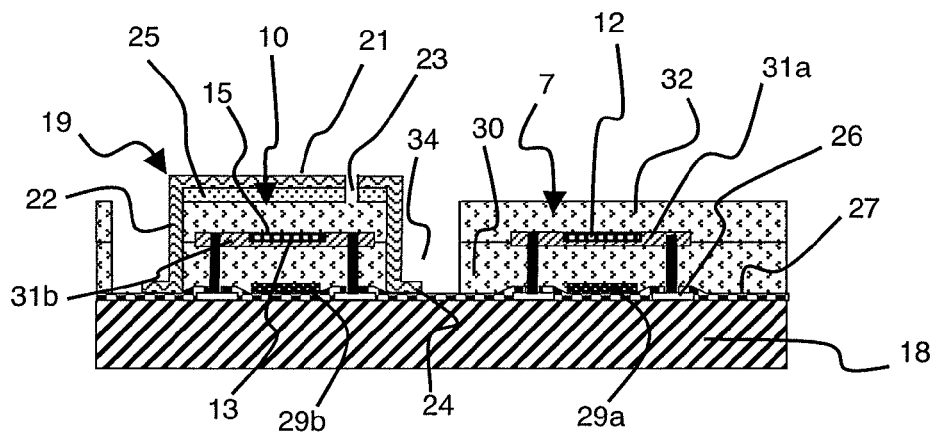

As shown in FIG. 17, first spared layer 33 and second metal layer 35 are etched in front of the location of active bolometer 7 and are maintained in front of reference bolometer 10, except, possibly, for one or several areas having dimensions smaller than 1 μm corresponding to opening(s) 23 intended to ease the subsequent removal of first and second sacrificial layers 30 and 32.

The etch conditions are defined to enable to remove first spared layer 33 and second metal layer 35 from above active bolometer 7 and to give its final shape to lid 19, including the shape of edge 24.

Figure 18:
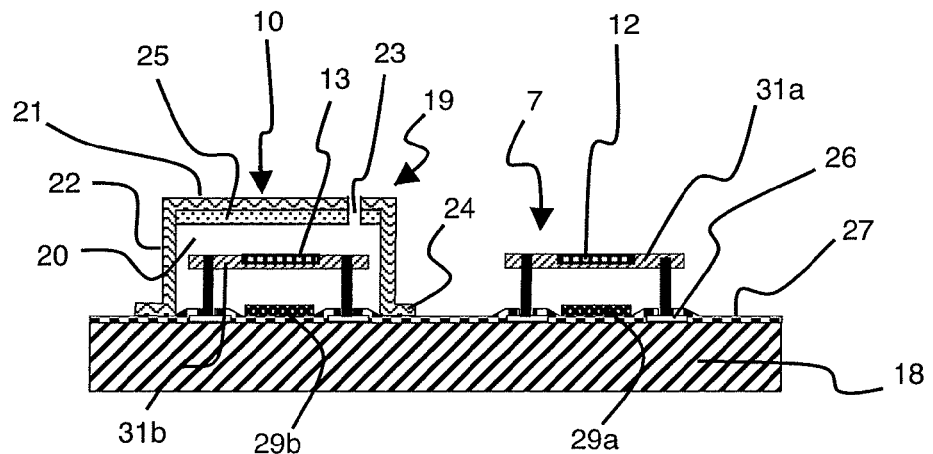

As shown in FIG. 18, first and second sacrificial layers, respectively 30 and 32, are finally removed by a gas-phase chemical etch step, especially through opening 23. This step enables the reactive etch species and the etch residues to communicate between the inside and the outside of lid 19. The removal of the first and second sacrificial layers, respectively 30 and 32, enables to expose cavity 20 of lid 19 and the empty space between second sensitive element 13 and lid 19.

At the end of this final etch step, an active bolometer 7 and a reference bolometer 10 made insensitive to incident electromagnetic radiation 8 and to the secondary electromagnetic radiation are available.

Figure 19:
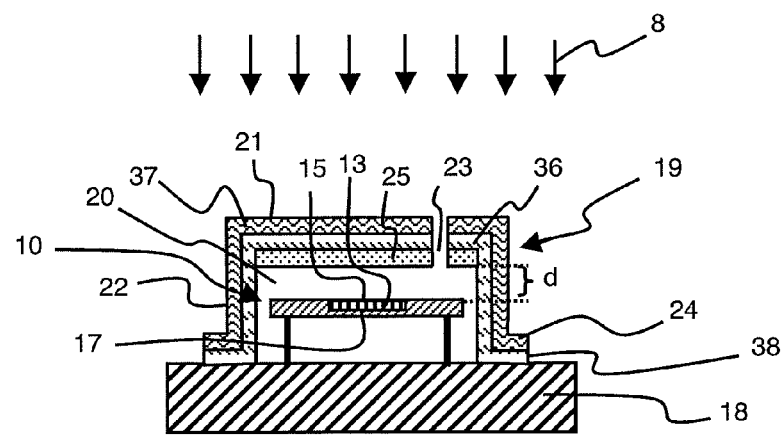
FIGS. 19 and 21 schematically show in cross-section view different variations of the detection device according to the present invention.

According to a fourth embodiment shown in FIG. 19, the device for detecting electromagnetic radiation 8 differs from the third specific embodiment described hereabove by the fact that lid 19 comprises a support wall 36 transparent to electromagnetic radiation 8 bearing on substrate 18 and arranged between continuous reflective shield 37 and cavity 20. Support wall 36 contributes to the robustness of lid 19.

As shown in FIG. 19, support wall 36 is in contact with structural layer 25. Upper side 21 of lid 19 is advantageously formed by a stack of three layers corresponding, from the outside of lid 19 to cavity 20, to the first reflective means, to the upper portion of support wall 36, and to structural layer 25. The first reflective means form the upper portion of continuous reflective shield 37.

Support wall 36 is preferably made of a material selected from among single-crystal, polycrystalline, or amorphous silicon, single-crystal, polycrystalline, or amorphous germanium, and silicon-germanium alloys (SiGe). For an infrared electromagnetic radiation 8, support wall 36 is formed of at least one dielectric material selected from among silicon, germanium, zinc sulfide, zinc selenide, silicon oxides, and silicon oxynitrides.

Support wall 36 is arranged between continuous reflective shield 37 and structural layer 25.

Lateral sides 22 of lid 19 are formed by the stacking of two layers corresponding to the second reflective means and the lateral portions of support wall 36. The continuous external surfaces of the two lateral sides 22 are formed by the second reflective means. Thus, the second reflective means form the lateral portions of continuous reflective shield 37.

The internal wall of lid 19 is accordingly formed by the lateral portions of support wall 36 and of structural layer 25, and the external wall of the lid is formed by continuous reflective shield 37.

As shown in FIG. 19, the external wall forming continuous reflective shield 37 does not join substrate 18 due to the presence of support wall 36 which interposes between continuous reflective shield 37 and substrate 18, at the level of edge 24 and forms an edge 38 capable of creating a secondary electromagnetic radiation by electromagnetic coupling.

To attenuate this electromagnetic coupling and avoid the secondary electromagnetic radiation, support wall 36 advantageously has a small thickness ranging from 10 nm to 500 nm.

Figure 20:
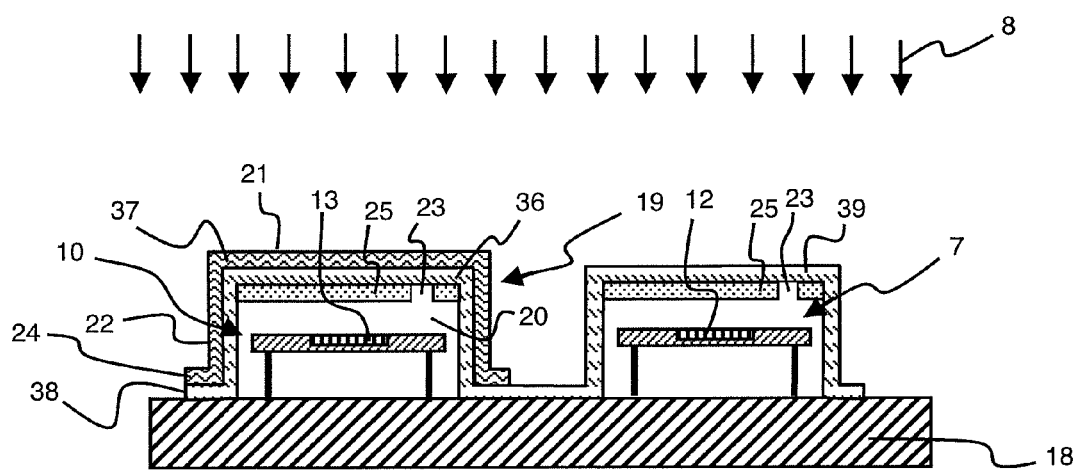

According to a variation shown in FIG. 20, the device for detecting an electromagnetic radiation 8 comprises an additional lid 39 transparent to electromagnetic radiation 8, having active bolometer 7 housed therein. Transparent additional lid 39 may be provided with a structural layer 25 identical to that previously described, but selecting one or several materials transparent to electromagnetic radiation 8. Transparent additional lid 39 and support wall 36 preferably form one and the same layer formed of one or several materials transparent to electromagnetic radiation 8.

The forming of additional transparent lid 39 provides advantages to the detection device without significantly increasing the detection device forming cost, since additional transparent lid 39 may be formed at the same time as support wall 36 which is already part of the method for forming the device, according to collective techniques known in microelectronics.

The presence of an additional transparent lid 39 advantageously enables to protect active bolometer 7 having a fragile suspended structure.

Transparent additional lid 39 isolates bolometers 7 and 10 from the external environment and especially enables to clean the detection device by standard blowing or washing methods which are impossible in the absence of lid 39. In such conditions, the packaging of the device for detecting electromagnetic radiation 8 becomes standard and no longer needs to be performed in an ultra-clean room as is the case for non-cleanable detection devices. This results in a significant decrease of production costs.

Further, the presence of an additional lid 39 according to this variation enables to enclose active bolometer 7 and reference bolometer 10 under vacuum by using known vacuum micro-encapsulation methods. In particular, the micro-encapsulation method described in article "Innovative on-chip packaging applied to uncooled IRFPA" by G. Dumont et al., published in Proceedings of the SPIE conference "Infrared Technology and Applications XXXIV", Vol. 6940, pages 1Y-1 to 1Y-6 (2008), or in patent application FR-A-2822541 is incorporated herein by reference. The sensitivity of the bolometers, 7 and 10, of the device for detecting an electromagnetic radiation 8 is substantially improved by a vacuum operation.

An exhaust hole (not shown), for example, in the form of a baffle as described in the above-mentioned article, enables to remove the sacrificial layers via opening 23 and is sealed by deposition of one or several thin layers forming additional lid 39. Continuous reflective shield 37 is formed according to a method identical to the third specific embodiment. It should however be noted that the size of opening 23 becomes, as compared with the above-described third specific embodiment, a parameter which only slightly affects the device efficiency and thereby may be greater than 1 µm.

According to another variation, not shown, support wall 36 is opened at the level of edge 24 of lid 19 by local etching, to suppress the presence of edge 38 and to place into direct contact the second lateral reflective means of lateral sides 22 with substrate 18.

According to another variation, not shown, the device for detecting electromagnetic radiation 8 mainly differs from the fourth specific embodiment in that the external wall of lid 19 is formed by support wall 36. Continuous reflective shield 37 is arranged between support wall 36 and cavity 20, for example, between support wall 36 and structural layer 25, and directly bears on substrate 18.

Figure 21:
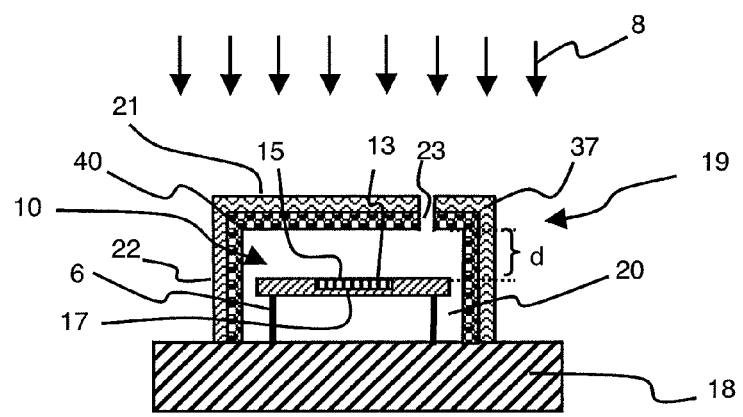

According to a fifth specific embodiment shown in FIG. 21, lid 19 has an internal wall formed by an absorbing layer 40. Absorbing layer 40 is intended to absorb at least the thermal radiations emitted by second sensitive element 13 of reference bolometer 10 so that cavity 20 forms an absorbing cavity.

Absorbing layer 40 is advantageously formed of at least one absorbing porous metallic material selected from among black gold, platinum, silver, and chromium. Black gold and platinum are currently used in the field of pyroelectric detection devices or thermoelectric cells and silver and chromium to form the black absorbers.

The bolometer thermalization is a consequence of the internal wall formed of a black body.

As a variation, absorbing layer 40 is formed by at least a polymer material containing graphite. Polymer materials containing graphite may absorb up to 80% between 2 µm and 20 µm of wavelength. Term polymer also applies to polymer resins of epoxy, polyimide and resist type.

To improve the absorption capacity of absorbing layer 40, said layer may also be formed as a multilayer and/or comprise several absorbing materials of different nature.

Reference bolometer 10 having above-described lid 19 then has a thermal resistance identical to or at least comparable with that of active bolometer.

According to a sixth specific embodiment, the device for detecting electromagnetic radiation 8 comprises a plurality of reference bolometers 10.

The device for detecting electromagnetic radiation 8 may comprise a plurality of reference detectors 10 and a plurality of lids 19. In particular, the device for detecting electromagnetic radiation 8 may comprise at least two lids 19 each independently covering a reference detector 10. Each reference detector 10 may advantageously be covered with a lid 19.

Figure 22:
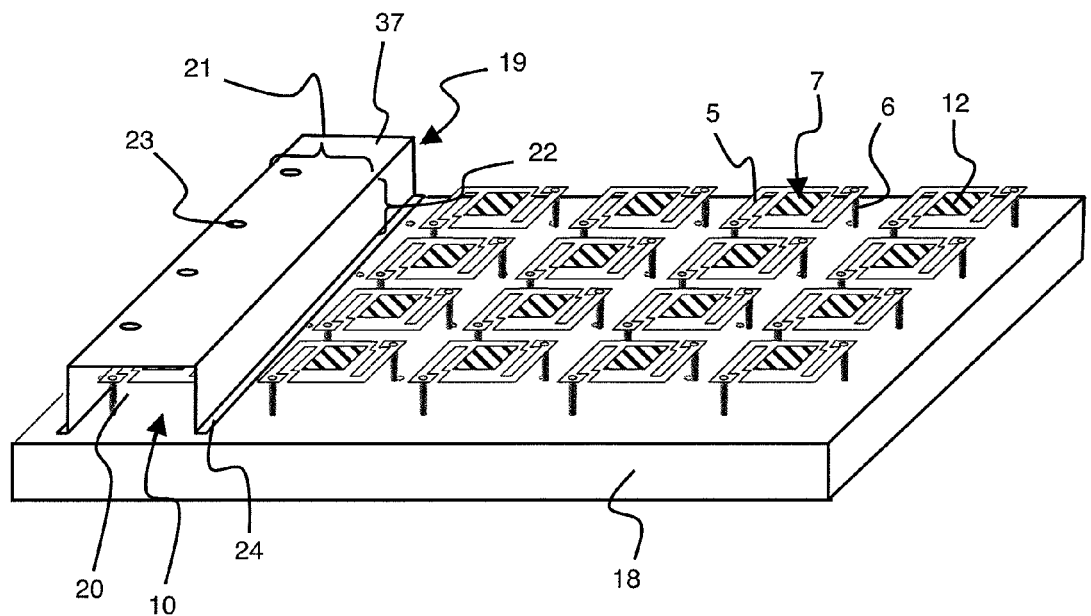
FIGS. 22 and 23 schematically show, respectively in perspective and in cross-section view, another specific embodiment of a device according to the present invention.
Figure 23:
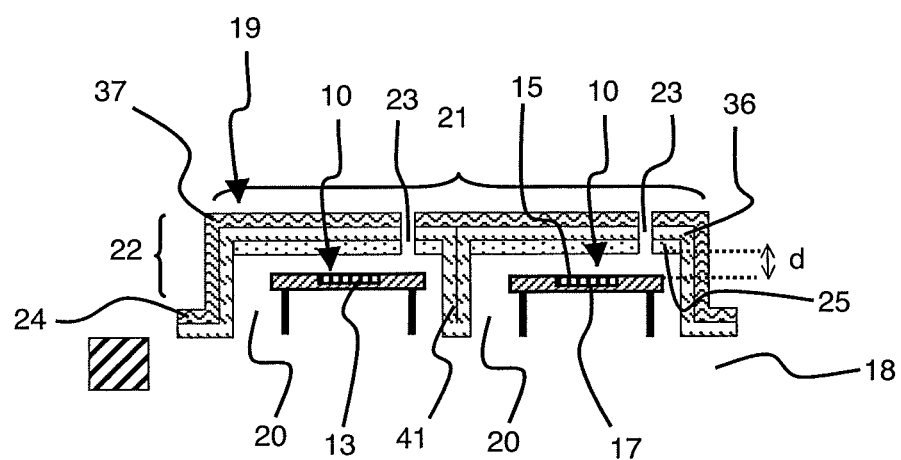

According to a specific embodiment shown in FIGS. 22 and 23, the device for detecting electromagnetic radiation 8 may comprise a plurality of reference detectors 10 and a lid 19.

As shown in FIG. 22, lid 19 covers the plurality of reference bolometers 10 and no active bolometer 7. The device for detecting electromagnetic radiation 8 may comprise at least three active bolometers 7.

Active bolometers 7 and reference bolometers 10 are arranged on substrate 18 in the form of an array of lines and columns. Each reference bolometer 10 is placed on substrate 18 at the head end of a line and/or of a column of the array.

The plurality of reference bolometers 10 is housed in a single cavity 20. Lid 19 only covers reference bolometers 10 arranged on a same line or on a same column of the array. Lid 19 is formed by an upper side 21 and two lateral sides 22 forming a single cavity 20 covering reference bolometers 10 and forming, as previously-described, an upside-down U, open at two ends. Upper side 21 and lateral sides 22 must be sufficiently long to provide an overhang at the level of the branches of the upside-down U. Indeed, lid 19 must cover with overlap of the first and last reference bolometers 10 located at the head end of a line or column, to suppress or at least decrease the electromagnetic coupling capable of occurring at the ends of lid 19.

The active bolometers 7 of a same line or of a same column are read simultaneously and jointly with the reference bolometer 10 common to the line or to the column and located at the head end of the line or column.

As shown in FIG. 22, the number of reference bolometers 10 is preferably smaller than the number of active bolometers 7 to allow a differential line reading with a duplication of the signal delivered by a reference bolometer 10 at the head end of a line. The duplicating of the signal delivered by reference bolometer 10 located at the head end of the line is redistributed towards active bolometers 7 of the considered line, to perform the differential read operation, one line at a time. Such a duplication and redistribution device may be formed by an electronic assembly according to any known method, for example, by a current mirror circuit which may advantageously be integrated on silicon substrate 18.

For each of the lines of the array of the device for detecting electromagnetic radiation 8, the cleaned signals resulting from the differential reading of active bolometers 7 on the one hand, and of the duplicated signals of reference bolometers 10 on the other hand, are respectively transmitted to signal processing means (not shown). The means for processing the signal may for example be formed by amplifiers, samplers, or multiplexers, preferably located at the bottom of a column (FIG. 22) to provide for them a large surface area as compared with the surface of active bolometer 7 of the array, which enables to provide a low noise level.

After the reading of the first line, the device for detecting an electromagnetic radiation 8 simultaneously reads active bolometers 7 of the second line, jointly with reference bolometer 10 of the second line and so on for all the lines of the device for detecting electromagnetic radiation 8. A column reading, based on the same principle, is also possible.

The synchronous reading enables to compensate for the sources of random noise which fluctuate along time, such as the common-mode electronic noise which affects the accuracy of the measurement current, differently at each time, but commonly for active bolometer 7 and for reference bolometer 10. Active bolometers 7 and reference bolometers 10 are read only once to form an image and thus have the same reading cycle in pulsed reading configuration.

According to a variation, not shown, it may be envisaged to duplicate the number of reference bolometers 10 and to integrate several reference bolometers 10 at the head end of a line and/or at the head end of a column, to extract a low-noise average signal, instead of having a single reference bolometer 10. As an example, the array may comprise eight reference bolometers 10 per line head end, to limit the general noise generated by reference bolometers 10. As another example, the array may comprise, for each line, four reference bolometers 10 at the head end of a line and four reference bolometers 10 at the other end of a line, to limit lacks of spatial uniformity introduced by matching imperfections between active bolometers 7 and reference bolometers 10 and contribute to improving the quality of the differential reading of the detection device. Reference bolometers 10 thus define the active bolometers 7 located at the center of the array.

The array may comprise several thousands of reference bolometers 10 to efficiently read an array of 640×480 active bolometers 7 for example forming the pixels of an IR detection device in differential read mode.

According to a variation shown in FIG. 23, lid 19 has at last one internal separation wall 41 arranged between two adjacent reference bolometers 10 so that lid 19 defines with substrate 18 several cavities 20, each of which has a reference bolometer 10 housed therein. All reference bolometers 10 then have strictly the same environment.

Lid 19 advantageously enables to create an environment strictly identical for each reference bolometer 10, whatever their situation within the array. Indeed, reference bolometers 10 placed at the border of lateral sides 22 of lid 19 encapsulating several columns of reference bolometers 10 may possibly undergo minute manufacturing method variations. Such variations then differentiate them from reference bolometers 10 placed at a distance from lateral sides 22 of lid 19. The lack of uniformity of the properties of reference bolometers 10 encapsulated by lid 19 adversely affects the operation of the device for detecting electromagnetic radiation 8. One or several internal walls 41 are accordingly introduced to avoid the lack of uniformity.

As shown in FIG. 23, internal separation wall 41 advantageously forms with support wall 36 one and the same layer formed in a single step according to any known method.

According to a variation, not shown, the device for detecting electromagnetic radiation 8 comprises several active bolometers 7 and as many reference bolometers 10 as there are active bolometers 7, thus avoiding the duplication of the signal originating from reference bolometers 10.

The electromagnetic radiation detection device according to the present invention is remarkable in that it enables to suppress the adverse effects of the secondary electromagnetic radiation and to accordingly optimize the offset current thresholding. In particular, the electromagnetic radiation detection device according to the present invention avoids any forming of ghost images due to a residual sensitivity of the reference bolometers and to an insufficiently opaque lid. The detection device according to the present invention allows a synchronous differential reading of the active bolometer and of the reference bolometer with a good matching. In particular, the device according to the present invention is advantageous in that it enables to subtract the disturbing effects, be they thermal or electric, to restore a more accurate signal, without having the disadvantages of volume, manufacturing complexity, and manufacturing cost of prior art.

Advantageously, as for example illustrated in FIGS. 5 and 18, first sensitive element 12 is not located in cavity 20 delimited by lid 19 and substrate 18. Cavity 20 then only contains second sensitive element 13. In other words, first sensitive element 12 is located outside of cavity 20 so that first sensitive element 12 and second sensitive element 13 are separated by lid 19.

Unlike the detection device of prior art, the electromagnetic radiation detection device according to the present invention provides a device of decreased bulk. This characteristic is particularly advantageous for IR detection devices with a large number of pixels.

The invention claimed is:

1. An electromagnetic radiation detection device comprising, on a same substrate:
   an active detector of the electromagnetic radiation provided with a first element sensitive to said electromagnetic radiation,
   a reference detector comprising a second element sensitive to said electromagnetic radiation, said second sensitive element having a first main surface facing an incident electromagnetic radiation and an opposite second main surface facing the substrate, a reflector comprising reflecting sidewalls supporting a reflecting cover, said reflecting cover and said reflecting sidewalls being configured for reflecting the incident electromagnetic radiation, and covering without contact the reference detector wherein said active detector is outside of the reflector, wherein the reflecting cover and the second sensitive element are separated by an empty space and by a distance ranging between 0.5µm and 5µm.

2. The device according to claim 1, wherein said distance is greater than or equal to 0.5µm and strictly smaller than 2µm.

3. The device according to claim 1, wherein said reflector comprises a support wall transparent to the electromagnetic radiation disposed on the substrate and arranged between said reflecting cover, said reflecting sidewalls and the substrate.

4. The device according to claim 3, wherein said support wall is formed by a material selected from among single-crystal silicon, polycrystalline silicon, or amorphous silicon, single-crystal germanium, polycrystalline germanium, or amorphous germanium, silicon-germanium alloys, zinc sulfide, zinc selenide, silicon oxides, and silicon oxynitrides.

5. The device according to claim 1, wherein said reflector comprises an external wall formed by a support wall transparent to the electromagnetic radiation and wherein said reflecting cover and said reflecting sidewalls are arranged between said support wall and the substrate, and are directly disposed on the substrate.

6. The device according to claim 5, wherein said support wall is formed by a material selected from among single-crystal silicon, polycrystalline silicon, or amorphous silicon, single-crystal germanium, polycrystalline germanium, or amorphous germanium, silicon-germanium alloys, zinc sulfide, zinc selenide, silicon oxides, and silicon oxynitrides.

7. The device according to claim 1, wherein said reflector comprises a structural layer arranged between said reflecting cover and the substrate.

8. The device according to claim 1, wherein said reflector is disposed on the substrate via two lateral sides and covers the reference detector by forming a bridge above said detector, and wherein each lateral side has a continuous internal surface and a continuous external surface and wherein the reflective sidewalls form at least the continuous internal surfaces or the continuous external surfaces of the lateral sides.

9. The device according to claim 1, wherein said reflector totally encapsulates the reference detector.

10. The device according to claim 1, wherein said reflecting cover and said reflecting sidewalls are formed by a metal layer of at least one metal material selected from among aluminum, titanium, gold, nickel, tantalum, tungsten, molybdenum, nitrides and silicides thereof, and their alloys.

11. The device according to claim 1, comprising a plurality of reference detectors and at least two reflectors each independently covering one of the reference detectors.

12. The device according to claim 1, comprising a plurality of reference detectors and wherein said reflector covers the plurality of reference detectors and no active detector.

13. The device according to claim 12, wherein the reflector is devoid of internal separation wall separating two consecutive reference detectors.

14. The device according to claim 12, wherein said reflector has at least one internal separation wall arranged between two adjacent reference detectors so that the reflector defines with the substrate several empty spaces, each of them having a reference detector housed therein.

15. The device according to claim 12, comprising several active detectors of the electromagnetic radiation and as many reference detectors as active detectors.

16. The device according to claim 12, comprising at least three active detectors, wherein the number of reference detectors is smaller than the number of active detectors, and wherein the active detectors and the reference detectors are arranged on the substrate in the form of an array of rows and of columns, each reference detector being placed on the substrate at the head end of a row and/or of a column of the array.

17. The device according to claim 16, wherein said reflector only covers the reference detectors arranged on a same line or a same column of the array.

18. The device according to claim 1, wherein said reference detector is identical to the active detector of the electromagnetic radiation.

19. The device according to claim 1, wherein the reflecting sidewalls comprise a material that reflects infrared radiation.

* * * * *